Oct. 24, 1939.    J. A. MURPHY    2,177,222
TIRE CASING HOLDER
Filed Oct. 5, 1936
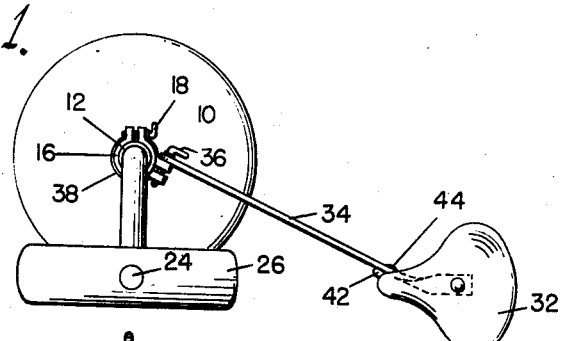
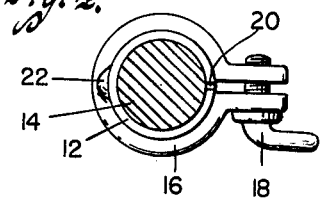
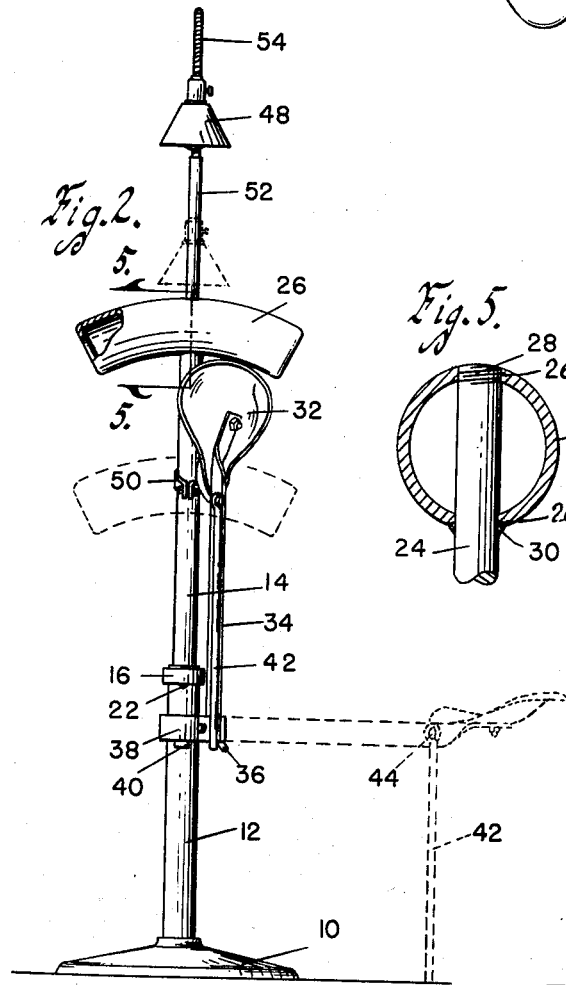
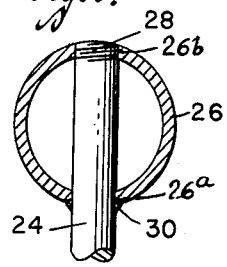
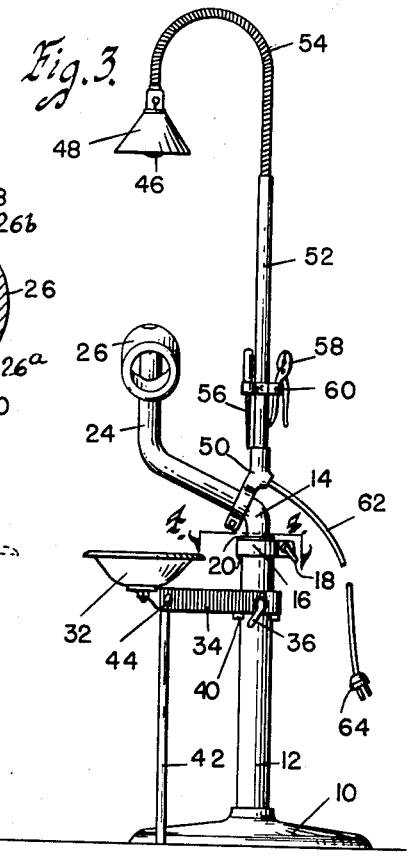
Witness
H. S. Menzenmaier
Inventor
James A. Murphy
by Bair, Freeman & Sinclair
Attorneys Patented Oct. 24, 1939

2,177,222

UNITED STATES PATENT OFFICE 2,177,222

TIRE CASING HOLDER

James A. Murphy, Des Moines, Iowa

Application October 5, 1936, Serial No. 104,153

1 Claim. (Cl. 154—9)

An object of my invention is to provide a tire casing holder of simple, durable and inexpensive construction.

A further object is to provide a holder especially adapted for holding a tire casing while grooving the treads thereof, as I have experienced considerable difficulty in holding the casing while performing such work.

More particularly it is my object to provide a tire casing holder comprising a base, an upright offset post having an arcuate head to be received in a tire casing and a seat so located with respect to the head that a casing supported on the head is in convenient position for being worked upon by the operator.

A further object is to provide a pivotal mounting for the seat so that it can be swung up out of the way when it is desired not to use it, and to provide a post which is extensible so that the seat can be raised to a higher position when working on the tire casing in a standing position than when working on it in a sitting position.

A further object is to provide a bracket on the holder for supporting a light for illuminating the work, means being provided for changing the position of the light as desired with respect to the work.

A further object is to provide a suitable holder for tools frequently used while performing the tire grooving operations on tire casings mounted on the holder.

With these and other objects in view, my invention consists in the construction, arrangement and combination of the various parts of the device, whereby the objects contemplated are attained, as hereinafter more fully set forth, pointed out in my claim, and illustrated in the accompanying drawing, in which:

Figure 1 is a plan view of a tire holder embodying my invention, and illustrating it with the light support removed.

Figure 2 is a side elevation of the holder showing the seat in elevated position by solid lines and in lowered position by dotted lines for working on tire casings in standing and sitting positions respectively.

Figure 3 is a rear elevation of the holder showing the parts in the position illustrated by dotted lines in Figure 2.

Figure 4 is an enlarged sectional view on the line 4—4 of Figure 3 showing a clamp; and Figure 5 is an enlarged sectional view on the line 5—5 of Figure 2 showing the connection of an arcuate head with a supporting post of the holder.

On the accompanying drawing I have used the reference numeral 10 to indicate a base for my tire casing holder. The base 10 is preferably of sufficient weight and diameter to normally prevent tipping over of the tire holder. For instance it may be formed of cast iron.

A tubular post 12 extends upwardly from the base 10 and slidably and rotatably mounted in the upper end thereof is an extension post 14. Means is provided for clamping the extension post 14 against rotation and against sliding movement relative to the tubular post 12. This means may be a clamp ring 16, such as shown in Figure 4, and a clamp screw 18, the post 12 being longitudinally split as indicated at 20 to permit reduction in the diameter thereof when the screw 18 is tightened. The clamp ring 16 may be welded, as indicated at 22, to the post 12 to prevent undesired dislocation thereof.

The extension post 14 is provided with an offset portion 24 operable as a handle to swing the extension post rotatably about the axis of the tubular post 12. The offset portion 24 is surmounted by an arcuate head 26. The head 26 may be formed of steel tubing or the like and secured to the upper end of the extension post offset portion 24 by threading indicated at 28 in Figure 5, and welding 30 to prevent unscrewing of the threaded portion and undesired rotation of the head relative to the extension post. The portion 24 extends through a lower perforation 26a in the head 26 and its threaded end enters a threaded perforation 26b therein.

In connection with my tire casing holder I provide a seat 32 supported on the outer end of a seat arm 34. The seat arm 34 is pivoted on a clamp screw 36 associated with a second clamp ring 38. Stop lugs 40 are welded or otherwise suitably secured to the post 12 below the clamp ring 38 to prevent undesired dropping of the clamp ring 38 relative to the post, yet permit rotation thereof around the post. A supporting leg 42 depends from the seat 32. This leg may be in the form of a rod having an eye at its upper end pivoted on a rivet or the like 44 extending through the seat arm 34.

In connection with my tire casing holder I provide a light 46 for illuminating the work. A reflector 48 is preferably provided for the light 46. The light is supported by a bracket 50 which in turn supports a rigid conduit 52 and a flexible conduit 54. The conduit 54 permits variable position of the light 46 relative to the tire casing when positioned on the head 26.

Practical operation

In the operation of my device, a tire casing is manipulated to receive the head 26, whereupon the operator may proceed with tread grooving or other operations on the casing. As the work progresses, the casing can be readily shifted along the head 26 to new positions as desired. The clamp screw 18 can be loosened for permitting raising of the extension post 14 to the full line position shown in Figure 2 when it is desired to stand up during the operations. Some operations, especially tread grooving, are quite tedious and at least part of the time it is desirable to perform the operations while sitting down.

The clamp screw 36 can, therefore, be loosened so that the seat can swing from the full line position of Figure 2 to the dotted position, the supporting leg 42 then supporting the weight of the operator instead of the seat arm 34 having to be made strong enough for this purpose. The seat can be rotated around the post 12 to the desired position for the convenience of the operator. The light 46, of course, can be adjusted to obtain best illumination on the work being done.

A few tools, such as a file 56 and a pair of pliers 58, may be supported by a tool holder 60 mounted on the conduit 52 where they are handy to the operator, for sharpening and adjusting his grooving tools.

The light 46 may be provided with the usual supply cord 62 terminating in a connection plug 64 which can be conveniently plugged into any available wall socket.

It will be apparent that my tire casing holder is comparatively light and relatively compact. It can, therefore, be readily transported in a service truck or the like from one job to another.

Some changes may be made in the construction and arrangement of the parts of my device without departing from the real spirit and purpose of my invention, and it is my intention to cover by my claim any modified forms of structure or use of mechanical equivalents, which may be reasonably included within their scope.

I claim as my invention:

In a tire casing holder, a base, an upright tubular post extending therefrom, an extension post having a straight portion mounted rotatably and slidably in the tubular post, a midportion extending angularly outward from the straight portion and an upright portion carried at the end of the midportion in a position at the edge of said base to permit a workman to stand close thereto, and operable as a handle to swing the extension post rotatably about the axis of said straight portion, and an arcuate head on said upright portion for mounting a tire casing, common means for clamping said straight portion at any desired rotative or elevated position relative to the tubular post, said clamping means comprising a band integrally coupled with the tubular post, said band and said post having coincident slots, one a single slot in said band and the other a single slot in said tubular post and a pair of ears at opposite sides of the slot in the band provided with an adjusting screw to tighten the band and tubular post jointly against the straight portion of the extension post.

JAMES A. MURPHY.